March 23, 1965  J. R. WEST  3,174,251
BLOWER

Filed April 20, 1961  6 Sheets-Sheet 1

INVENTOR
John R. West

BY *Strauch, Nolan & Neale*
ATTORNEY

March 23, 1965

J. R. WEST 3,174,251

BLOWER

Filed April 20, 1961

INVENTOR
John R. West

BY Strauch, Nolan & Neale

ATTORNEYS

March 23, 1965   J. R. WEST   3,174,251
BLOWER

Filed April 20, 1961   6 Sheets-Sheet 3

INVENTOR
John R. West

ATTORNEYS

March 23, 1965

J. R. WEST 3,174,251

BLOWER

Filed April 20, 1961

INVENTOR
John R. West

BY
ATTORNEYS ing purposes.
United States Patent Office 3,174,251
Patented Mar. 23, 1965

3,174,251
BLOWER
John R. West, Marysville, Ohio, assignor to The O. M. Scott & Sons Company, Marysville, Ohio, a corporation of Ohio
Filed Apr. 20, 1961, Ser. No. 104,418
17 Claims. (Cl. 43—148)

The present invention relates to a blower device and more particularly relates to hand carried apparatus for dispensing and distributing dusting compositions such as insecticides and fungicides for gardening purposes.

Hand operated portable devices previously known or sold on the market have used both the plunger pump and the rotary blower as a means of developing an air flow. However, the difficulty of economically manufacturing a duster which can properly meter the dust in relation to volume and velocity of air is clearly evidenced by the fact that such devices have not appeared on the market although devices to perform dusting function have been marketed for at least the last hundred years.

In a proper dusting application and particularly for fungicidal control, it is important that the underside of plant foliage be coated. This requires that the dust be discharged in a stream at a velocity that permits it to be directed from the base of the plant upward through the foliage.

Several problems have continually plagued manufacturers of previously known dusters intended to be effective to create an airflow for mixing a dusting composition with a stream of air and applying the dusting composition over comparatively large areas with what has been considered an acceptable degree of uniformity. In this regard, portable dusters normally use a hand crank mechanism to operate the blower and the dusting composition is dispersed into the airstream created by the blower and dispensing of dusting material into the stream was normally accomplished downstream of the blower as an expedient in keeping the dust out of contact, as much as possible, with the blower fan and the various bearings. One primary problem was the difficulty in attaining relatively high pressure heads needed for creating a high velocity airflow in these hand operated blowers. Also, there were troublesome problems presented in maintaining operation of the blower drive mechanism in view of the sometimes corrosive action of the dust residues on the various metals and bearing structures used in drive mechanisms. The majority of the previously known blower type dusters have used a stepped-up speed ratio gearing between the crank and the blower fan. Nevertheless, they fail to obtain sufficient velocity to maintain the dust particles in free floating disposition in the airstream along the discharge tube, and collections and build-ups of dust occur. Furthermore, the arrangements for transferring or metering the proper minute quantities of dust fom the dust container to the dispensing airstream have never been wholly satisfactory in previously known blower dusters, the result being uneven discharge of agglomerations or masses of the dust, a wholly uneconomical aspect, apart from possible undesired effects on the plants being dusted.

Accordingly, it is a primary object of this invention to provide a novel blower type portable dusting device, providing even and economical distribution of dusting material in the dispensing airstream.

A further object resides in providing a dispensing blower apparatus with an improved high ratio step-up gearing between a rotatable input shaft and the rotor of a dual inlet high velocity discharge rotary blower, the dual inlets providing independent fluid communication to the blower rotor.

In conjunction with the foregoing object, it is a further object to provide such a dispensing blower with a device for metering a material, to be entrained and dispensed by the fluid passing through the blower, into one of the fluid inlet streams.

Another object resides in the provision of a dusting device with novel apparatus for efficient, proper dust distribution and dispensing, incorporating a preliminary mixing chamber with an auxiliary preliminary air inlet, a device to meter specific small quantities of dust correlated with airflow into the mixing chamber, a primary high volume air inlet and a high speed blower device receiving air from both inlets and providing high velocity discharge of an airstream with even distribution of dust particles in the discharge stream.

A still further object resides in providing a hand duster with an improved high ratio step-up gearing between a hand crank and the rotor of a dual inlet high velocity discharge rotary blower, one of the inlets receiving a preliminary charge of a premixed dispensing dust and preliminary air from a mixing chamber upstream of the blower.

In conjunction with the foregoing object, it is a further object to provide such a duster with a hopper disposed above the mixing chamber and a novel dust metering device between the hopper and the mixing chamber, the metering device being actuated cyclically at a greatly reduced ratio relative to the velocity and volume of air being discharged.

A further object resides in providing a novel combination metering and agitating device for use in dusters which consists of a unitary assembly forming a partition wall between a dust storage hopper and a mixing chamber, a spring biased plate valve member controlling metered passage of dust through an opening in the partition wall and providing a vibrator device on the hopper side of the partition wall and a valve member operator device on the discharge side of the wall subject to cyclical periodic actuations.

A still further object resides in providing in the combination of a portable hand operated blower type dusting device with a separable storage container, novel interconnecting structure and function enabling snap fastening of the duster hopper to the open end of a dust container, for operator convenience in attachment and removal of a container of dust, and enabling rapid interchanging of containers with different dusting formulations.

A further object resides in providing a duster including a hopper and a blower fan with novel provision in the lower portion of the hopper of a metering device cyclically operative in conjunction with rotation of the blower fan, the metering device dispensing precise portions of the dusting material into a preliminary mixing chamber, there being two separate air passages into and through the blower fan, one of which is in series communication with the preliminary mixing chamber, the airstream through the two passages being maintained separate within the fan and being combined into a common discharge outlet.

In conjunction with the preceding object, a further object resides in the provision of a novel arrangement between the preliminary mixing chamber air inlet opening, the metered dust inlet opening, and the outlet from the preliminary mixing chamber, such arrangement effectively preventing a backflow of preliminarily mixed air and dust back through the air inlet to the preliminary mixing chamber.

Another object of this invention resides in providing a novel metering which retains its effective metering capabilities and promotes proper flow of the dust from the container even though held with the vertical axis of the container at varying angles from a true vertical. In this respect, it is to be noted that many dusters are designed to operate effectively only when held in a level or horizontal position.

Further novel features and other objects of this invention will become apparent from the following detailed description, discussion and the appended claims taken in conjunction with the accompanying drawings showing a preferred structure and embodiment, in which:

Before proceeding with a detailed description of the exemplary construction of the illustrated duster, some characteristics of dusts and conditions affecting dust dispersal which are believed to be important should be considered.

A prime factor to consider in design of an efficient and effective dust dispenser (duster) is the need to eject the insecticide or fungicide dust particles under conditions wherein each particle remains separate from other particles during the course of application and will not fall out of the airstream before it reaches its destination, i.e., the plant which is being dusted. Bearing in mind that the insecticide and fungicide particles with which this invention is concerned comprise particle sizes ranging between 1 and 20 microns, the fundamentals of particle dynamics should be considered. It is believed that the two most important of these aspects of particle dynamics involve terminal velocity of the particle and the Van Der Waals effect (the mutual effect of one particle on an adjacent particle).

Terminal velocity is a function of drag coefficient, the fluid viscosity in which the dust particle is dispersed, particle size and particle density. In discussing terminal velocity, the term $u_t$ represents relative velocity between the particle and the bulk of the fluid. Except for extraneous effects, such as turbulence, it makes no difference whether the fluid moves past the particle or whether the particle moves through the fluid. The terminal velocity is the maximum difference between velocity of the fluid stream and the velocity of the particle being carried by the fluid stream. A particle falling under the action of gravity will accelerate until the frictional drag of the fluid just balances the gravitational acceleration, after which it will continue to fall at a constant velocity, which is known as the terminal or free settling velocity, which can be determined by specific equations set forth in the Chemical Engineer's Handbook, third edition, published by McGraw-Hill, page 1019. Particles are also subjected to random motion designated as a Brownian movement due to the impact of gas molecules on the particle. For particles finer than $\frac{1}{10}$ of a micron, this random motion is far greater in magnitude than any directed particle motion due to gravitational settling and results in the floating of minute particles in the atmosphere. Because we are concerned here with the carrying of a particle within a high velocity fluid stream, the Brownian movement can be used to explain floating (lack of settling) of individual particles.

For particles less than 50 microns in diameter, which includes the sizes of dust particles primarily involved herein terminal velocities will be attained in a minute fraction of a second and acceleration periods may be neglected. When the velocity of a fluid stream greatly exceeds the terminal velocity of a particle, such particles will, of course, be carried along with the airstream and they will remain essentially in desired dispersion as they pass through a discharge tube and even after exiting from the nozzle end the particles will be carried along in dispersed arrangement against the setting force created by gravity. Therefore, if a discharge velocity of sufficiently high value is obtained it will assure that properly dispersed individual dust particles can be directed upwardly toward the bottom surfaces of plant leaves for a sufficient distance to assure that such particles reach and engage the plant leaves.

Theoretical considerations due to terminal velocity of these individual dust particles apply only where the particle concentrations are low enough (less than 20 grains per cubic foot) so that the particles will have no mutual effect upon each other. Although the exact reaction or attraction between two particles is not believed to be known at this time, it is known that particles of dust exhibit a tendency to attract and hold other particles of comparable size against their surfaces. The reaction or attraction forces between particles of the organic material may possibly be explained by the theory resulting in what is known as the Van Der Waals effect. The Van Der Waals forces are based on the theory that the attraction forces between particles are electrical and vary continuously within the structure of the particle to provide a re-arrangement or change in the structure of adjacent molecules. It is reasoned that although the negative charges of the electrons in a neutral molecule are balanced by the positive charges on the nuclei, the electrons being continually in motion, the center of density of the negative charges of the electrons does not continuously coincide with the center of density of the positive charges of the nuclei. This condition gives rise to transient slight separation of charge in a molecule, or an electrical dipole, which is called the polarization of the molecule. Stated another way, these dipoles result from momentary dis-symmetry in the positive and negative charges of the atom in neighboring atoms or molecules. These dipoles tend to align in anti-parallel direction and thus result in a net attractive force which varies inversely as the seventh power of the distance between ions. A result of this dipole situation is that molecules of dust particles which approach each other closely enough and with the proper orientation tend to adhere, the ends of unlike charge attracting each other. Once the attractive force comes into play, the polarization of the molecules is increased. Even simple molecules such as helium and hydrogen have some tendency to adhere. The case of polarizability and hence the strength of the forces increases as the number of electrons increases, and hence as the number and complexity of the atoms and the molecules increase. Whatever the validity of this theory, it has been discovered that particles of dust tend to combine together to form blobs or concentrated groups of dust particles.

With the foregoing dynamic characteristics in mind, in accord with the dusts of powder form for which the duster of this invention is intended to be used, the velocities of the fluid stream, at least at discharge location at the end of the discharge tube, can be calculated to be between 40 to 60 feet per second, to maintain particles in proper independent dispersion in the fluid stream and to be carried against the forces of gravity to the location desired, to assure proper and economical dusting application. The primary reason for such a high velocity airstream is based on the desire to maintain even distribution of a proper amount of dust per unit volume of air so that the individual dust particles passing from the blower will substantially remain in independent dispersion in the air during the passage of that volume of air through the discharge tube and for several feet after the airstream leaves the discharge end of the tube. If the air velocity is not at a sufficiently high value, the dust will tend to settle out and concentrate in small blobs resulting in ejection of wasteful concentrations of dust particles from the end of the discharge tube.

Knowing the desired value of terminal velocity at the end of the discharge tube and choosing a discharge tube with a reasonable cross sectional area, together with consideration of other factors such as the length of the tube, the frictional loss incurred by the boundary layer against the inside wall of the tube, the airflow in cubic feet per minute can be determined by known engineering formula and a desired capacity centrifugal blower can be designed. In the exemplary embodiment a 3,000 feet per minute velocity is attained at the end of the tube with a hand crank rotation of 80 revolutions per minute or 1⅓ revolutions per second and the blower fan creates a passage of 0.183 cubic feet per second.

It is also desirable that only a specific small amount of dust be metered into the dusting airflow in accord with the mass or volume of air in order to minimize the mutual attraction effect between particles in a stream. To accomplish this, an accurate metering device appropriately correlated to operate proportionately to the blower fan volume output has been developed. To assure a more complete distribution, this portion of dust is metered into a preliminary chamber where it undergoes preliminary mixing in an auxiliary airstream prior to such mixture being subjected to high velocity. In accomplishing this aspect a preliminary chamber, constructed to prevent backflow of air out of its air intake, was developed. The duster utilizes two airflow paths, one at a relatively low velocity through the preliminary mixing chamber and the other at a high velocity through the main portion of the blower fan. The two paths join at the blower fan peripheral exit where the preliminarily mixed dust, already in substantially even distribution, is picked up by the high velocity airstream, is maintained in even distribution and passes through the discharge tube and is ejected at high velocity into the free air. It has been found that such a coordinated metering, mixing high velocity and discharge is necessary to assure complete and even distribution of the dust in the open air ejection stream for proper application to leaves of plants, particularly where the ejection is directed upwardly to the undersides of the leaves.

The aforenoted blower fan discharge volume of 0.183 cubic feet second at a hand-crank speed of 80 r.p.m. resolves to a discharge of approximately 0.138 cubic feet for each rotation of the hand crank. As will be later more completely described, the metering assembly is operated five times for each rotation of the hand crank. Using simple mathematics, there are approximately 36 operations of the metering assembly for each cubic foot of air displaced through the discharge pipe. If each metered discharge dispensed one particle of dust, there would be 36 particles of dust per cubic feet, from which there would be essentially no mutual effect or Van Der Waals effect of one particle on the other when the particles are maintained in substantially even distribution throughout the cubic foot of air. This would be theoretically perfect efficiency of dispensing in the exemplary blower. However, practical considerations of manufacturing tolerances and cost of a metering device and presence of bends, twists and friction in the ducts dictate that a surplus of dust particles be metered during each cyclic operation of the metering device to assure that a sufficient amount of dust be discharged and reach the leaves of plants. Even so, the metered quantity per cycle is maintained in the approximate range of from 10 to 50 grains per operation depending upon adjustment. The exact number of particles or grains has not been determined but it is quite small.

Referring now more specifically to the drawings, FIGURES 1 and 2 show an exemplary form of the manually operable portable dusting device 20 with an attached canister 22 constituting a storage reservoir for dust being dispensed. The canister 22 has an open top with external screw threads 24 which enable the canister to be coupled into the open top of a hopper 26 integral with the duster body. A screw-threaded lid will fit on the threaded top of the canister for storage and/or sale of the filled canister. As will become apparent later in this description, the specific material from which the canister is made will enable novel snap attachment cooperation with internal screw thread formations 27 at the hopper periphery. The threads 27 preferably have rounded peaks and valleys in the manner of Whiteworth or British Association type standard screw thread formations to enable ease in the snap attachment. The duster has a high speed rotary blower with a tangential discharge member 28 into which is spigotted one section 30 of a telescoped discharge tube 29. It is to be understood that a reversed spigotted connection could be used. The dust discharge tube 29 is of sufficient length to enable ease of application of the dust without requiring the operator to stoop to get close to the dust in the air, and consists of two sections 30 and 32 of progressively decreasing cross-sectional area to maintain desired high velocity of the discharge airflow. A deflector plate 34 is mounted on the terminal end of the second section 32 in a manner enabling swiveling through at least a 180° arc to enable the operator to deflect the dust carrying airstream either downwardly or upwardly, depending upon whether it is desired to place the dust on the top or bottom surfaces of plant leaves. If desired, of course, the deflector can be easily made to deflect the airstream sideways.

The exemplary duster has been constructed for use in combination with a canister of dust as its primary storage member and, therefore, does not include a large integral storage space. Nevertheless, if desired, the duster unit construction could utilize a large integral storage hopper.

Apart from canister 22 and the discharge tube 29, all working parts of the duster 20 are contained in a housing assembly 38 which itself consists of four components: the central, major housing part 40 which includes hopper 26; the fan cover 42 for the blower compartment; a gear housing 44; and a gear housing cover 46.

A saw grip type of handle 48, seen in FIGURE 1 and partially sectioned in FIGURE 4, is secured by two screws 50 (FIGURE 4) and 52 (FIGURE 3) to the central housing 40. The housing assembly 38 and the bridge portion 54 of handle 48 are made of metal, preferably a die cast aluminum alloy. A handle grip insert 56, preferably made of plastic, is molded to fit the inner contour of the handle bridge portion 54, and also to fit the contour of the hand, and is maintained in position within the bridge portion 54 by a spigoted post 58 and socket 60, the post 58 being retained within the socket 60 by a "Tinnerman" tubular clip 62. An upper portion 64 of the handle bridge 54 is located by abutment with the lower side of hopper 26, the screw 50 passing from inside of the hopper 26, through the hopper wall and threaded into the upper handle portion 64. In a somewhat similar manner, a lower portion 66 of the handle bridge 54 rests against the underside of the central housing 40, fitting into a groove 68 (see FIGURE 3) and is retained within the groove 68 by means of a bowed clip retainer 70 held on the lower handle portion 66 by the screw 52. When screw 52 is tightened, the bowed clip retainer 70 tends to flatten out and will grip the side edges of groove 68 to securely retain the handle 48 in position.

Figure 1:
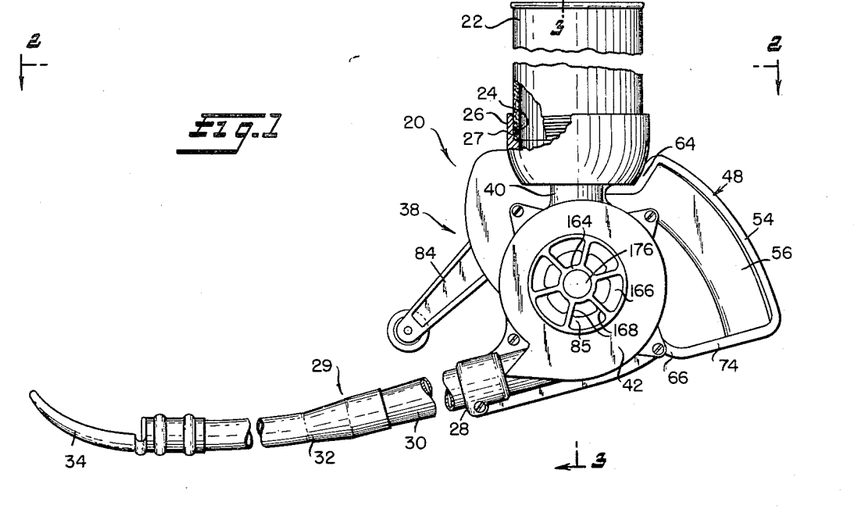
FIGURE 1 is a side elevation view illustrating a portable duster made in accord with the present invention, portions of the canister and hopper being broken away to illustrate details of snap connection.
Figure 2:
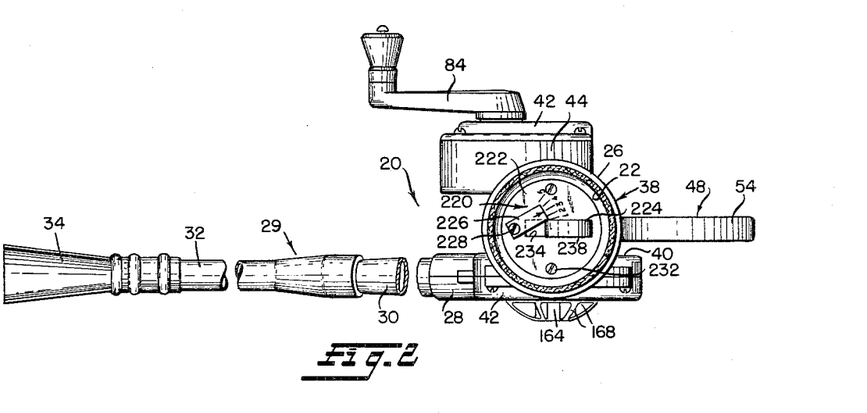
FIGURE 2 is a top plan view of the duster shown in FIGURE 1, the dust canister being sectioned in order to illustrate the top of the metering valve and partition plate.
Figure 3:
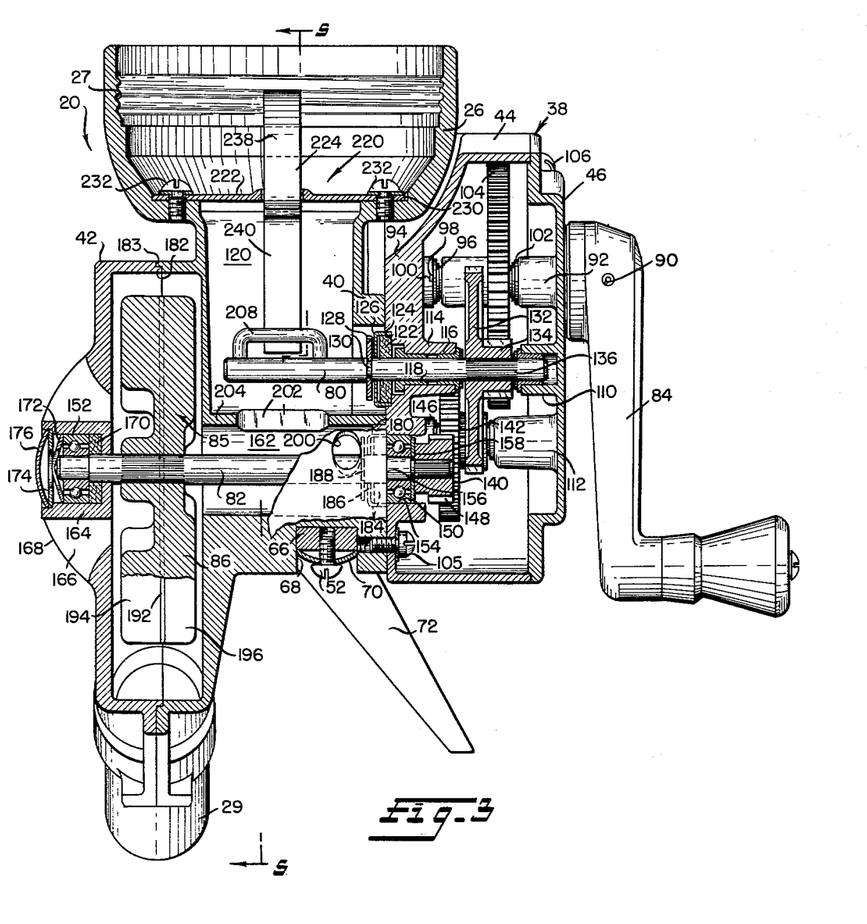
FIGURE 3 is an enlarged vertical section taken on line 3—3 of FIGURE 1, and is a view from the rear illustrating the primary internal components of the duster with the canister removed.
Figure 4:
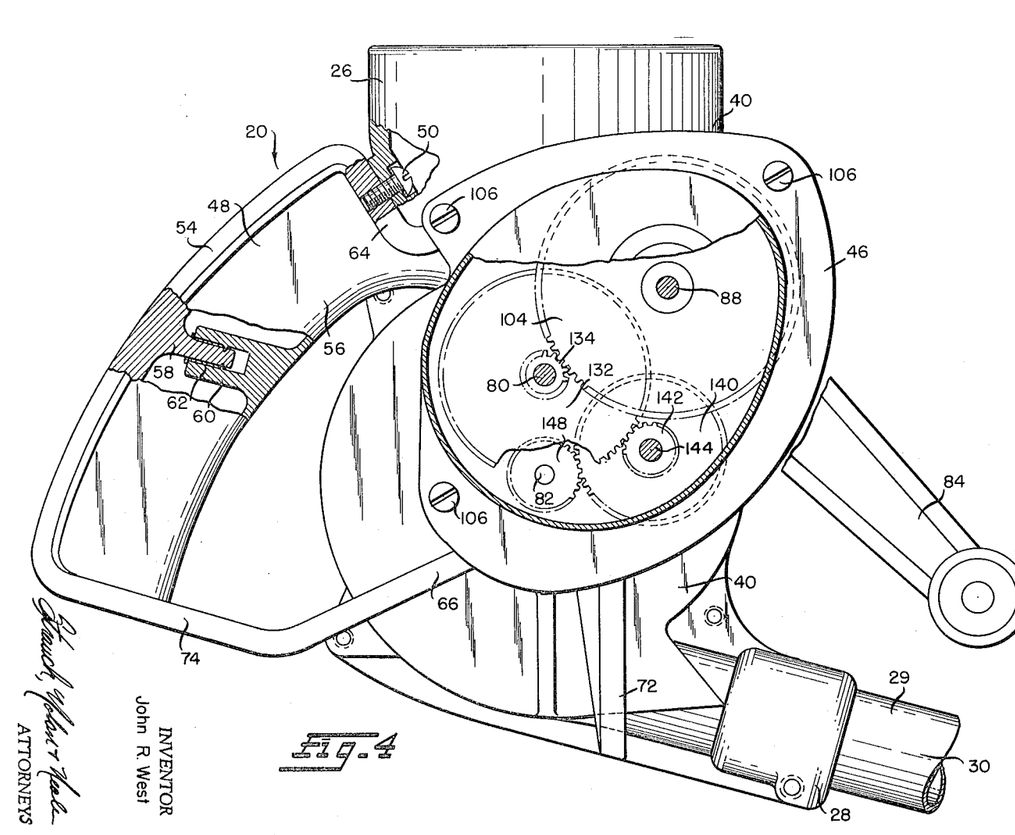
FIGURE 4 is an enlarged side elevation view of the duster showing the side opposite to that seen in FIGURE 1, some of the housing structure being broken away to illustrate gearing arrangement, handle structure and other details.

Seen in FIGURES 3 and 4, the lower portion 66 of handle 48 includes a support leg 72 positioned a short distance in front of retainer clip 70. As apparent in FIGURE 4, handle 48 also has a level bottom flange 74, the lower surface of which is in a common plane with the lower end of support leg 72 and the lower edge of the blower discharge member 28. This arrangement constitutes a tripod support which will enable the duster 20 to be stored in an essentially upright position when it is placed on a smooth surface. It is to be understood that the duster body and handle need not be made of metal but could be made from any suitable lightweight, rigid material.

Returning to FIGURE 3, the driven mechanism has two operating rotatable shafts: an upper cam shaft 80 for operating the metering device and a lower fan shaft 82. Both of shafts 80 and 82 derive their rotation from a hand crank 84 located on the opposite side of housing assembly 38 from the blower 85. The blower includes a centrifugal fan rotor 86, which will be referred to as a fan, which is a double or parallel flow fan made as a structurally integral unit, as will be more completely described hereinafter. Fan shaft 82 is rotated at a much higher speed ratio than the agitator cam shaft 80, the difference in drive ratios being accomplished by means of gearing located in the gear housing 44. There is an approximately 5:1 step-up speed ratio between the crank 84 and the agitator cam shaft 80 and there is an approximately 50:1 step-up speed ratio from the crank to the fan shaft 82. The gearing includes four gears, two of which carry integral pinions and with reference to FIGURES 3 and 4 the gear relationship will now be described.

Hand crank 84 is non-rotatably secured to an input shaft 88 by means of a rolled spring pin 90, the shaft 88 passing through an apertured bearing boss 92 in the gear housing cover 46 and projecting to the rear wall 94 of gear housing 44. The inner end of shaft 88 is disposed in a nylon sleeve bearing 96 which is held in a blind bore (not shown). Wherever applicable in this gearing assembly, such nylon sleeve bearings are used and each bearing has a radial flange formed with a small lug 98 which fits in a notch 100 in the bearing seat and prevents rotation of the nylon bearing to avoid undue wear of the nylon bearing which would occur if the bearing sleeve were permitted to rotate in the semi-finished bores. A similar bearing 102 is placed in the inner side of gear housing cover boss 92 and a first large nylon gear 104 with seventy-nine (79) teeth is non-rotatably secured on the input shaft 88 by a press fit over a serrated portion of the part of input shaft located on the inner side of the gear housing cover 46. Steel washers may be disposed between the end faces of gear 104 and the two nylon bearings 96 and 102.

The gear housing 44 is secured to the central housing 40 by screws 105 and the gear housing cover 46 is secured to the gear housing 44 by means of additional screws 106. Upon removal of the gear housing cover 46, the hand crank 84 with its adjoining input shaft 88 and the press fit gear 104 will also be removed from the assembly, inasmuch as the inner end of input shaft 88 is merely spigoted into the nylon sleeve bearing 96. Housing cover 44 also has two additional blind bored bosses 110 and 112, each of which mounts one of the previously described nylon sleeve bearings, and when the cover 46 is removed from gear housing 44 these blind bores and their sleeve bearings merely slip off the end of the shafts which are rotatably journaled therein.

One of the cover bearing bosses, boss 110, journals the outer end of the agitator cam shaft 80 which extends through a boss 114 formed in the side wall 94 of gear housing 44. In addition to the bearing in cover boss 110, cam shaft 80 is rotatably journaled by two additional nylon sleeve bearings 116 and 118 placed in the opposite ends of the bore formed through the boss 114. The inner end of shaft 80 thus extends in an overhung fashion into the lower portion of a central chamber 120 (referred to later in this description as the intermediate chamber) in the central housing part 40. Because the walls of chamber 120 have direct contact with the dust being dispensed, a felt washer 122 is placed on shaft 80 at the interior of chamber 120 and is retained against the shoulder of a recess 124 formed in the gear housing end wall 94 by a metal dust shield 126 press fit into the recess 124. A spring clip washer 128 fastened in a groove 130 in shaft 80 adjacent the dust shield 126 and a drive gear 132 on the other side of the end wall 94 serve to axially fix the agitator cam shaft 80. Drive gear 132 with sixty-four (64) teeth has a structurally integral pinion 134 which meshes with the large crank driven input gear 104, gear 132 being non-rotatably secured on a serrated portion 136 of agitator cam shaft 80 by a press fit. If desired, a metal washer may be placed between the end face of gear 132 and the adjacent nylon sleeve bearing 116. Pinion 134 has fifteen (15) teeth which provides a step-up speed ratio between gear 104 (seventy-nine teeth) and the shaft 80 of approximately 5:1, as previously noted. All gears used in this duster are preferably made of a plastic such as nylon which is desirable to reduce weight, eliminate need for lubrication, eliminate noise and eliminate the detrimental formation of rust caused by moisture.

An idler gear cluster consisting of a gear 140 and integral pinion 142 is press fit on external serrations of an idler shaft 144. The idler gear shaft 144 is axially positioned between the aforementioned cover bearing boss 112 and a blind bored bearing boss 146 located on the side wall 94 of gear housing 44. Both of the bosses 112 and 146 carry nylon bearing sleeves in a manner similar to that described for bearing sleeve 96 and steel washers may be placed between the gear end faces and the end flanges of the nylon bearings. Pinion 142 meshes with the large gear 132 on the agitator cam shaft 80 while the large idler gear 140 meshes with a small driven gear 148 non-rotatably secured on the end of fan shaft 82. Gear 140 has forty-eight (48) teeth, its integral pinion 142 has fifteen (15) teeth and the fan shaft gear 148 has twenty (20) teeth. Considering the specific numbers of teeth and the specific meshed arrangement of the gears as described in this paragraph, one skilled in the art can readily determine that the step-up speed ratio from the hand crank rotated input shaft 88 to the fan shaft 82 is approximately 50:1.

Because of its extremely high rotational speed, fan shaft 82 is journaled in roller bearings 150 and 152, bearing 150 having a snug sliding fit within a bearing aperture 154 located on the side wall 94 of gear housing 44. The end of shaft 82 adjacent gear 148 has a reduced diameter providing a shoulder 156 which abuts the inner race of bearing 150 whereas the extreme end of fan shaft 82 is serrated and receives its drive gear 148 in a pressed non-rotatable fit. There is a nylon washer 158 disposed between the end face of fan shaft gear 148 and the inner race of bearing 150, the cooperation between gear 148 on the end of fan shaft 82 and the shoulder 156 axially maintaining the shaft in its proper position relative to bearing 150.

Projecting through and beyond the end wall 94 of gear housing 44, fan shaft 82 extends completely through a cylindrical pre-mixing chamber 162 integral with and located at the bottom of central housing part 40. The axis of cylindrical chamber 162 is laterally disposed and will be maintained substantially horizontal during duster operation, although the metering device, to be described, and dust mixing and dispensing will occur in a proper manner even when the duster is tilted sideways and also while the duster is titlted fore and aft within a range of plus and minus approximately 40° relative to the vertical position of the container.

The left-hand end of fan shaft 82 has a serrated portion upon which the hub of fan 86 is non-rotatably press fit. The extreme left end of fan shaft 82 extends beyond the rotor 86 and projects through an aperture in a bearing retaining housing 164 centrally disposed in the fan chamber cover 42. Surrounding the bearing retainer housing is the primary air inlet consisting of a series of openings 166 formed by the spaces between a plurality of integral vane-like members 168 extending radially between the bearing retainer housing 164 and the wall of the fan housing cover 42. Vanes 168 support the bearing retainer housing 164. That end of the fan shaft 82 which projects into the retainer housing 164 passes through a felt washer 170, has a reduced diameter terminal portion inserted into the inner race of bearing 152, and bearing 152 is held in the retainer 164 by a thrust spring 172, a retainer washer 174 and an expansion plug plate 176. These units create a spring bias, forcing the bearing 152 against the felt disc 170 which effectively prevents extraneous dirt and dispensed dust from entering into the bearing retainer chamber 164.

Inasmuch as the axes of the bearing boss bore 154 and of the bearing retainer 164 must be coaxial, the central housing part 40 is utilized to serve as a common alignment member between the gear housing 44 which carries bearing 150 and the fan housing cover 42 which carries bearing 152. In accomplishing this alignment, the gear housing 44 includes a cylindrical spigoted portion 180 which pilots on the inner side of cylindrical chamber 162 when the gear housing 44 is secured in place on the side of central housing 40, and the fan housing cover 42 includes a piloting flange 182 (see left-hand side of FIGURE 3) which cooperates with a matching recess 183 on the side of central housing 40. A felt washer 184, dust retainer cover 186 and spring clip washer 188 are located on fan shaft 82 inside the chamber 162 adjacent bearing 150 in the same manner as the dust seal on agitator cam shaft 80 and prevents the dust being dispensed from gaining entry into the gear casing 44 through the bearing 150.

The duster blower is a centrifugal type blower having a center inlet to the fan blades 86 and a scroll casing with a tangential discharge 28. As previously stated, the blower of this duster is a double fan and has two inlets and a common peripheral discharge. This is accomplished within the single casing by utilizing a structurally integral but double fan 86 which has six blades on each side of a disc partition 192 which divides all of the fan blades into two side by side blades. The left-hand portions 194 are slightly larger in width than the right-hand blades 196 and provide a high velocity high volume blower with blade segments undercut at the radially innermost portions to provide a center inlet receiving airflow from the fan casing inlet 166. The inlet air is pumped by the high speed of rotation of fan 86 into a high velocity airflow through the scroll casing tangential discharge member 28.

The smaller fan blade segments 196 are located adjacent the discharge casing wall provided by the central housing 40. These blades 196, during fan rotation, create a suction force at the left-hand end of the pre-mixing chamber 162 and thereby draw a quantity of pre-mixed air and dust into the right-hand side of the fan 86 from whence it is discharged outwardly into the scroll casing. In the scroll casing the pre-mixed air and dust become completely mixed with the high velocity large volume discharge airflow from the left-hand blades 194 and this resultant mixture is continually discharged through the blower discharge member 28 and on out through the tube 29 during fan rotation.

Returning now to the previously described pre-mixing chamber 162, it is seen that such chamber has two inlet openings. The first is a small opening 200 located in the rear wall of the central housing part 40 adjacent the dust shield 186 and is the inlet for preliminary mixing air. This specific location provides airflow through the preliminary mixing chamber 162 from one end closely adjacent the dust cover 186 to the other end which is also the fan inlet. The second opening into the preliminary mixing chamber 162 is an inlet for dust made in the form of an elongated slot 202 and located in a partition wall 204 at the top side of the cylindrical pre-mixing chamber 162 between chamber 162 and the previously described intermediate duster chamber 120. Because of the location of the entire extent of the dust inlet slot 202 between the preliminary air inlet 200 and the fan chamber inlet, together with reverse flow blocking afforded by the split fan, opportunity for backflow of dust from the pre-mixing chamber back out through the preliminary air inlet 200 is essentially negated. Dust inlet 202 provides for introduction of a metered quantity of dust into the preliminary mixing chamber 162 from intermediate chamber 120.

Both the fan cover air inlet 166 and the air inlet 200 in the back of the main housing are located close to the associated bearings so that the airflow is always in a direction away from the bearings, thereby providing assistance in keeping the dust out of the bearings.

Figures 5, 6:
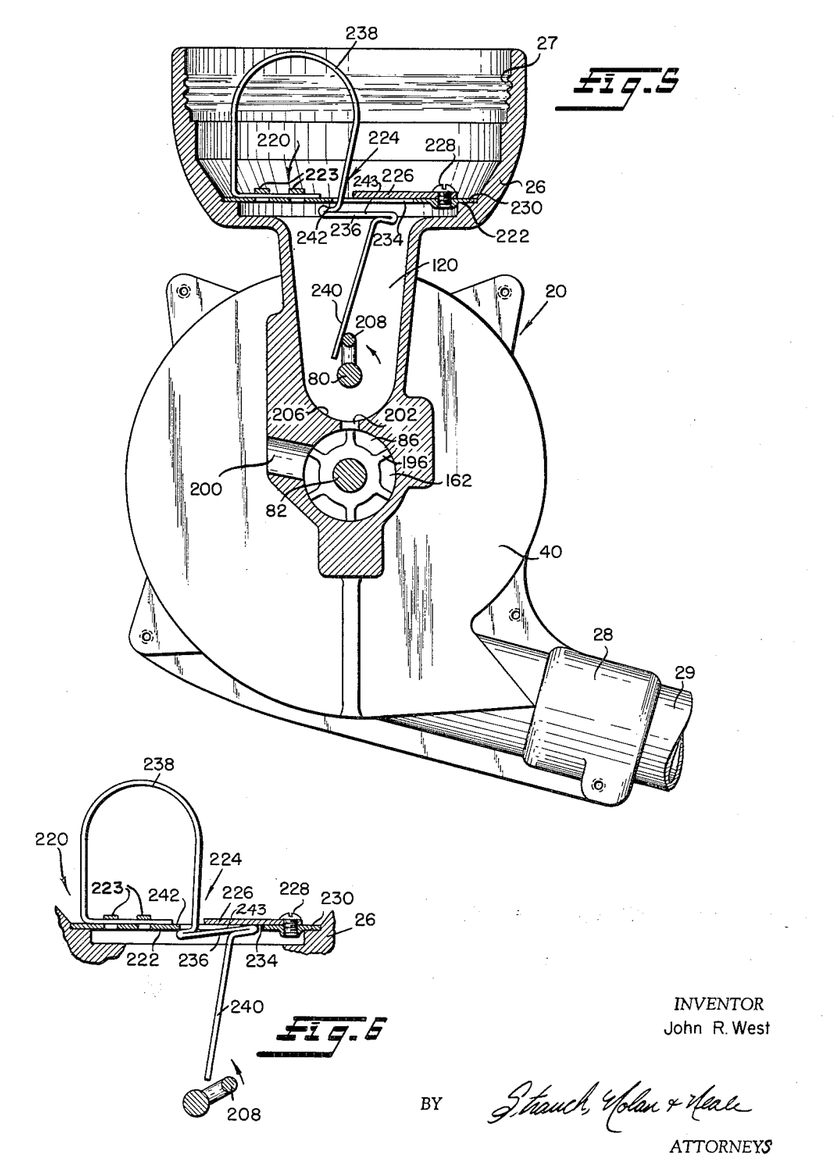
FIGURE 5 is an enlarged vertical section taken on line 5—5 of FIGURE 3 illustrating the metering components at a mid-position during one of the cyclic operations and also shows the preliminary mixing chamber inlet and the opening from the preliminary mixing chamber into the blower fan chamber.
FIGURE 6 is a detail view of the metering device seen in FIGURE 5 to illustrate the closed position of the valve plate.

Intermediate chamber 120 can be made to have any reasonable shape commensurate with the cooperating components of the assembly. However, its lower portion should converge toward the elongate opening 202. As shown in FIGURE 5, chamber 120 has its lower surface 206 formed in a semi-cylindrical fashion coaxial with the agitator cam shaft 80. This cylindrical shape conforms somewhat to the path of rotation of a rigid bent wire camming element 208 formed in the shape of an offset bridge and secured as by welding to the overhung end of the agitator cam shaft 80 which, as has been described, is disposed within the chamber 120. As cam shaft 80 is rotated the bridge-shaped camming portion 208 cyclically contacts a metering and agitating device, to be later described, which meters a specific small quantity of dust to be dispensed into the chamber 120 from the hopper located immediately above. This dispensed dust tends to float through the dust inlet slot 202 into the preliminary mixing chamber 162. The continued rotation of shaft 80 causes the camming bridge 208 to pass closely adjacent to surface 206 and will tend to brush any accumulation of dispensed dust on the lower walls down toward and through the elongate slot 202.

Figures 7, 8:
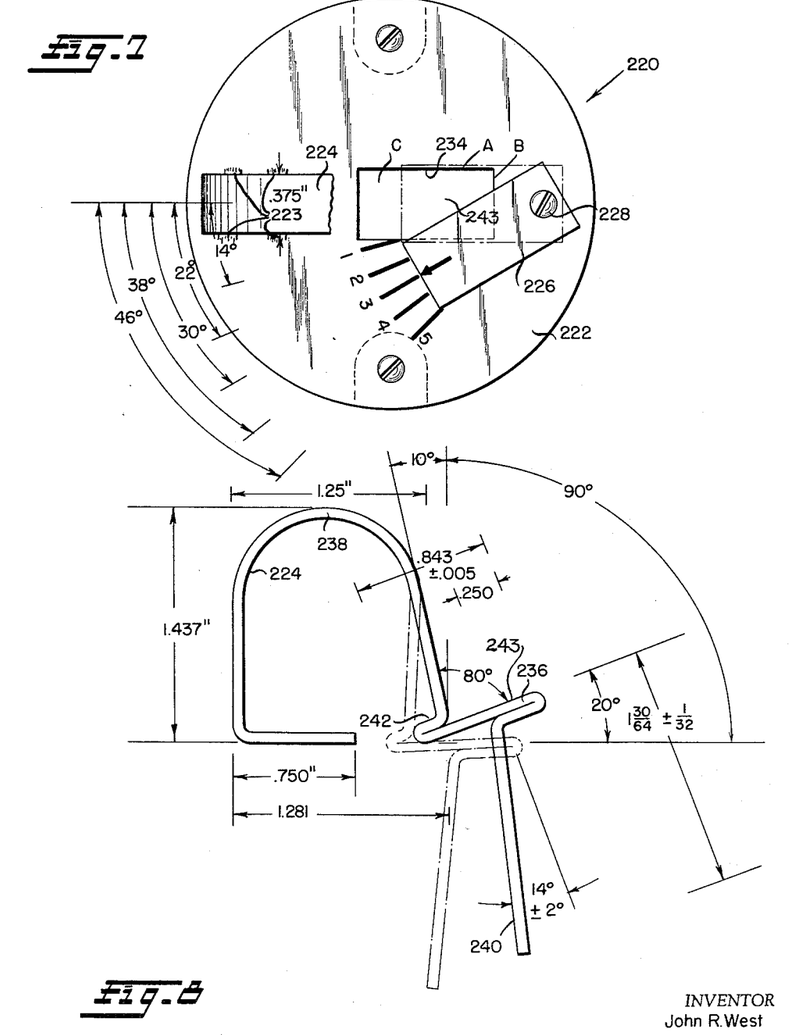
FIGURE 7 is a greatly enlarged top plan view of the partition plate and metering assembly, the combination valve and vibrator spring being broken away to illustrate details of the metering plate orifice.
FIGURE 8 is an enlarged detail side elevation of the combination metering valve closure, vibrator spring support and operating finger, scaled to correlate with FIGURE 7, and with FIGURE 7 includes exemplary dimensions which will provide a mechanism having the desired metering movement.

The upper end of intermediate chamber 120 is coextensive with the lower end of the aforedescribed hopper 26. However, the hopper 26 and the chamber 120 are separated by a metering device subassembly 220, best shown in FIGURES 5 and 6 (details in FIGURES 7 and 8), which provides a partition wall and consists of a metering plate 222, an adjustable meter rate control plate 226, a screw 228 which releasably secures the control plate 226 to the metering plate 222 and permits the control plate to be laterally shifted for adjustment, and a combination metering member, agitator and spring device 224. The latter member 224 is staked to the metering plate 222 by semi-punched lugs 223 as shown in FIGURES 5, 6 and 7. The complete metering device subassembly 220 rests on a horizontal annular shoulder 230 at the bottom of the hopper 26 and is rigidly fastened by screws 232.

Because metering plate 222 serves as the lower wall of hopper 26, the stored quantity of dust being dispensed through the duster will rest directly on the upper surface of the metering plate 222. A rectangular opening 234 in plate 222 constitutes the valving port through which dust will be metered from the hopper 26 into the intermediate chamber 120. Except for predetermined intervals of hand crank rotation, the rectangular port 234 will be closed (see FIGURE 6) by a rectangular segment 236 of the metering member 224 which is substantially the same shape as rectangular opening 234 and serves as a plate valve member. In non-actuated position, rectangular segment 236 is disposed almost co-planar with the metering plate 222 and within the rectangular opening 234, being maintained in such position by spring bias from the upper loop 238 of spring 224 which is pre-stressed from its free (full line) position shown in FIGURE 8. This stress tends to urge the rectangular closure portion 236 upwardly and to the right. The upper limit of movement of rectangular closure portion 236, FIGURE 6, is determined by engagement between the upper right-hand end of rectangular portion 236 and the lower surface of the rate control plate 226, and by a small curved edge of the left-hand end abutting the lower edge line of the left-hand end of port 234, as viewed in FIGURES 5 and 6. This closed position of the spring is shown by phantom lines in FIGURE 8. When the meter-member and spring 224 is so disposed, the portion of rectangular opening 234 in the metering plate 222 which is not covered by the rate control plate 226 provides a predetermined area of the upper surface of the rectangular control member 236 for dust to rest upon.

Turning now to FIGURE 5, it will be noted that as the camming bridge 208 is rotated counterclockwise, it will engage a depending leg 240 of the member 224 extending down from the rectangular control portion 236. Continued counterclockwise rotation of camming bridge 208 forces the leg 240 toward the left. This action results in a tightening of the bow of the bowed spring portion 238 and when this occurs, the rectangular closure control member 236 must move downwardly a slight amount and to the left slightly, carrying with it only a small quantity of dust which is resting on its upper surface as is determined by the rate control plate 226. The remaining dust in the container forms a dome bridge over the opening 234. During this portion of movement, some dust will fall away from the small uncovered extent of edge B in FIGURE 7 and a very slight amount will drop from edge A. Further rotation of camming bridge 208 clears the tip end of leg 240 and permits a rapid return of closure member 236 to the right which snaps the member 236 back up into closed position within the rectangular opening 234. This rapid return flexure of the spring metering member snaps the left-hand platform 242 of control member 236 from under a portion of dust which rests behind the spring portion and a pre-determined amount of grains of powder will drop from this shelf into the intermediate chamber 120.

Because the powder-like particles of the dust will bridge over openings and not flow through such openings, the only quantity of dust which descends when the closure member 236 is drawn down to an open position is a small mound of dust on top of the closure member 236. A dust or powder bridge dome occurs above opening 234 to prevent further powder from the hopper from dropping into the intermediate chamber.

At the time snap action closure of member 236 is initiated, the spring bow 238 will undergo a vibration which breaks the powder dome causing stored powder to settle in the hopper toward the opening 234 as closure member 236 is approaching closed position. Inasmuch as the small quantity of dust on the right-hand shelf 243 of the platform of the control member 236 moves up with the platform, it meets the downwardly moving powder from the collapsing dome, thereby causing a compression effect which results in a lateral metered ejection or "squirting" of the powder which was resting on the right-hand platform 243 just prior to complete closure.

This quantity of grains of dust metered during the opening and closing of port 234 is rather minute, in the order of from 10 to 30 grains of dust powder for setting "3" (FIGURE 7). When rate control plate 226 is closed to setting "1" the number of dispensed grains from edge B is decreased and, conversely, when opened to setting "5" the dispensed grains falling from edge B are increased.

For each such manipulation of this combined metering valve and spring member 224, a relatively pre-determined number of grains (or particles) of dust will be dispensed into the intermediate chamber 120. The dust metered from the left-hand platform 242 of control member 236 is constant while that dispensed from the right-hand platform 243 depends upon the setting of rate plate 226. This minute quantity of dust will be dispensed even though the duster is tilted away from vertical, so long as the tilting is within approximately 40° from a vertical position of the container because it does not depend upon gravity flow of the powder for the primary metering action. As an assembly adjustment, the amount of dust being metered can be determined by manufacturing control of the angle existing between operating leg 240 and the control platform 236, and the length of the leg 240. The speed of rotation of the camming bridge 208 determines the rapidity with which the rectangular metering member oscillates to open position and back to closed position. It has been determined that an optimum angle between the leg 240 and the control platform 236 is 14° plus or minus 2°. This is a fixed relationship once the metering device subassembly 220 has been secured in the duster 20. Operational adjustment of the metering action is accomplished by changing the position of rate plate 226, as aforenoted. The metering device subassembly 220 is drawn to scale in FIGURES 7 and 8 and, in accord with FIGURE 5, can be readily reconstructed.

Earlier in this description some aspects of particle adherence were discussed, and in connection therewith it is noted that increased mutual attraction of particles as the number of adhered particles increase results in globs or agglomerations of dust. One problem which this agglomeration presents occurs in formulation of the specific dust before the dusts are packaged, and results in agglomerations of molecules of the constituent, dusts within a mixed formulation, for example, a mixture of sulfur, fermate, arsenic, etc. will include within the mixture small agglomerations of each constituent. In the present duster, the minute metering and the jarring nature of the metering action, to a degree, tends to break down some of the packaged formulation agglomeration, resulting in a subsidiary advantage accruing from the duster.

The exemplary duster construction, as has been described, is intended for use with dust canisters 22 which provide dust storage capacity for the duster 20. The canisters which have screw-thread top ends 24 are preferably constructed with a cylindrical wall made from a semi-rigid material such as a stiff cardboard or plastic having sufficient firmness to maintain their configuration and yet permit a slight flexure, particularly at the screw-threaded end. The canister base could be either metal or the same material as the cylindrical wall. Made from such material, a canister 22 lends itself to a convenient method of attachment to the duster, a method which avoids inconvenience to the operator of attempting to screw a dust-filled canister into the threads of the duster hopper while using care not to spill any dust or let the dust contact the operator's hands, inasmuch as many insecticide and fungicide dusts are toxic to the human skin.

Figures 9, 10, 11:
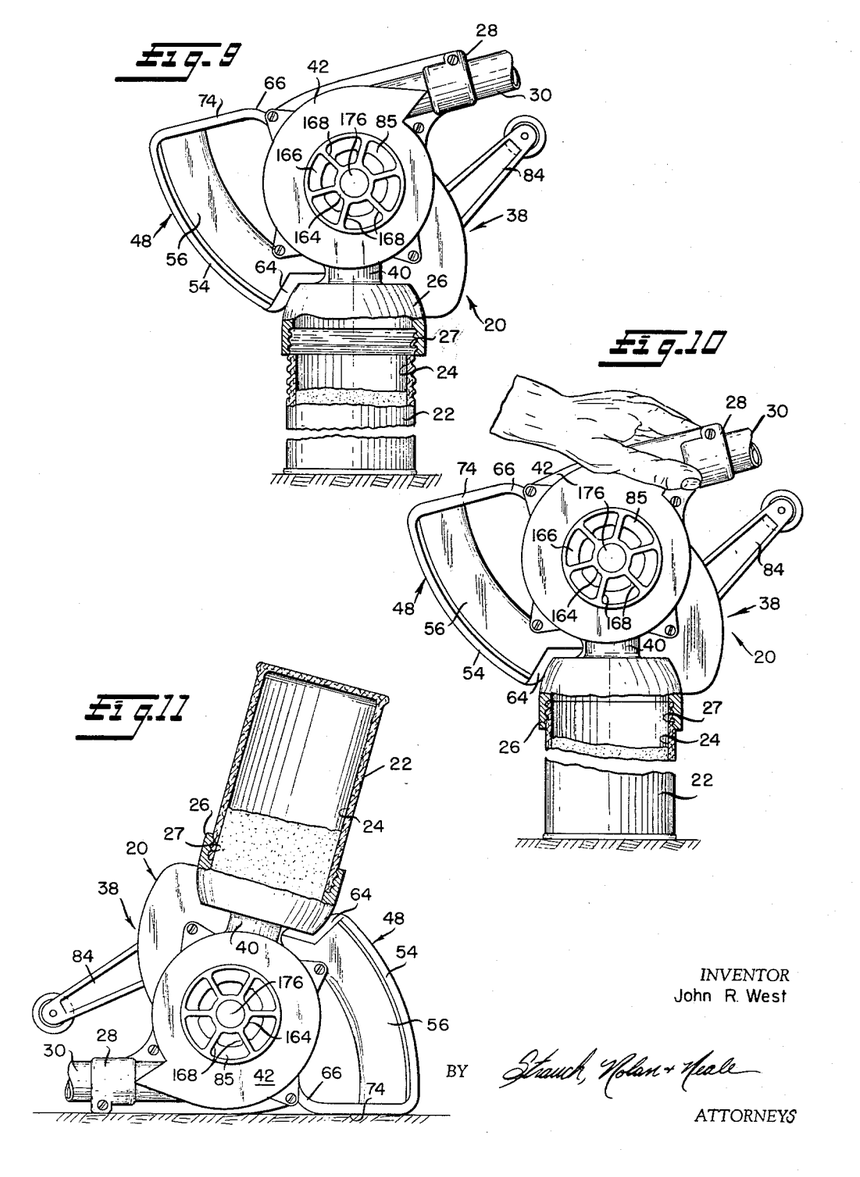
FIGURES 9, 10 and 11 illustrate the method of snap attachment of the duster body to a canister of dusting powder, FIGURE 9 illustrating inverted placement of the duster on an upright canister, FIGURE 10 illustrating quick attachment by a downward force, and FIGURE 11 illustrating the duster in upright rest position with canister attached.

FIGURES 9, 10 and 11 illustrate the relatively simple attachment method. After removing a lid from a dust-filled canister 22, the canister 22 is placed on a solid surface, (e.g., a work table top), the duster 20 (with or without the discharge tube) is turned upside down, as in FIGURE 9, and placed with the hopper-threaded periphery 27 above and in engagement with the canister screw thread top 24. A straight downward pressure or a sharp blow with the operator's hand on the bottom of the duster 20 will result in the duster hopper threads being forced downward over the canister threads, the latter flexing slightly and then snapping into threaded position in the hopper, as in FIGURE 10. A rotational twisting force applied to the canister 22 will assure a tight fit of the threads. To use the duster 20 it must, of course, be turned upright so the dust falls into the hopper, as in FIGURE 11.

The duster can be used with canisters having rigid threaded ends, in which case the duster cannot be snapped onto the canister but will have to be deliberately screwed on or the canister screwed into the duster.

In removing any canister, the duster is turned upside down and the canister unscrewed. The one duster can be used to dispense many kinds of dust merely by changing one canister of dust for another canister containing a different kind of dust.

The foregoing description discloses a portable hand duster which evenly and economically distributes dusts, such as insecticides and fungicides, in a high velocity airstream and directs the dust toward plants in such a manner that all dust is air-borne in the discharge stream and is not discharged in puffs or heavy masses which could cause excessive plant leaf discoloration. The duster incorporates a special metering device, an arrangement of preliminary metered and mixing chambers, a dual parallel path centrifugal fan rotor, and carefully designed gearing and drive mechanism bearing and seal construction to provide continued proper duster operation over an extended period. A quick method of attachment of a dust canister to the duster hopper has also been disclosed.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A blower device for applying dusts such as insecticides and fungicides to plants comprising: a storage means for dust; a blower means including a mixing chamber for creating a confined flow of air transposed into a high velocity high volume discharge stream; and means including a mounting spring and an oscillatable, vibratory valve device supported on said mounting spring providing intermittent communication between said hopper and said mixing chamber for cyclically positively metering minute quantities of grains of dust, by virtue of frequency of vibratory movement of said valve device, into the confined flow of air in said mixing chamber and power means connected to said blower means and adapted to engage and cyclically operate said oscillatable device so the vibratory frequency of said valve device is directly proportional to the speed of operation of said blower means.

2. The blower device as defined in claim 1 including adjustment mechanism attached to said metering means for changing the quantity of grains of dust metered from said storage means to said mixing chamber during each metering cycle.

3. The blower device as defined in claim 1 wherein said means including said oscillatable valve device for cyclically metering minute quantities of grains of dust comprises: a unitary assembly including a means adapted to form a partition between said storage means and said mixing chamber and having an opening therethrough; a bowed spring valving means for controlling metered passage of dust through said partition opening, and providing vibrator means on the dust storage side of said partition and an operator on the mixing chamber side of said partition adapted to be cyclically engaged by said power means and thereby subject to intermittent cyclical actuations.

4. The blower device as defined in claim 3 including an adjustment member and means releasably securing said adjustment member to said partition enabling variation in the size of the partition opening to control the cyclical metered quantity of grains of dust.

5. The blower device as defined in claim 3 wherein said valving means includes at least one surface portion adapted to receive a small mound of dust from said storage means, said vibrator means comprises a spring means providing a connection between said valving means and said partition permitting operative movement of said valving means with vertical and horizontal directional components of shift, and cyclical engagement of said operator by said power means provides a positive shift of said valving means away from said partition with a quick release of positive shift permitting a snap action closure shift of said valving mechanism under spring bias whereby cyclic frequency of operative shift of said valving means will effect the metered discharge per cycle of operation of said valving means.

6. A duster comprising: a mixing chamber with an air inlet and an air outlet, a high velocity discharge rotary blower in closed flow communication with the outlet of said mixing chamber, drive means for said rotary blower including a high ratio step-up gear mechanism to provide a discharge airstream into, through and out from said mixing chamber, a storage means disposed above said mixing chamber and a material metering device providing communication passage means between said storage means and said mixing chamber, said metering device having an operator portion adapted to be cyclically engaged by a portion of said gear mechanism to be actuated cyclically to cause opening and closing of said communication passage means at a speed ratio greatly reduced relative to the speed of said rotary blower.

7. A blower type portable dusting device comprising: a preliminary mixing chamber, means for intermittently dispensing minute quantities of metered particles of dust into said preliminary mixing chamber, means for causing an airflow through said preliminary mixing chamber to mix and carry the dust particles in suspension out of said chamber, and means in fluid communication with said chamber for receiving said preliminarily mixed air and dust for admixing additional air and ejecting said suspended dust particles in a high velocity airstream having a materially greater volume of flow per unit of time than the volume of airflow per same unit of time through said preliminary mixing chamber.

8. A dusting device with apparatus for even distribution and dispensing of dust particles comprising: a duster body including a preliminary mixing chamber having an auxiliary preliminary air inlet, hopper means above said chamber for containing a stored quantity of dust, a metering device under said hopper means and providing a connection passage means to meter specific small quantities of dust from said hopper, correlated with airflow, into said mixing chamber, a primary high volume air inlet, a high speed blower device and means enabling said blower device to receive air in independent paths from both inlets, and drive means connected to said blower device providing high velocity high volume discharge of an airstream therefrom.

9. A combination dust discharge metering and dust storage agitating device for use in dusters comprising: a unitary assembly including means adapted to form a partition between a duster dust storage hopper and a duster mixing chamber and having an opening therethrough; and a bowed spring valving means for controlling metered passage of dust through said partition opening, said valving means including a shiftable closure member for said partition opening, vibrator means adapted to agitate the dust on the hopper side of said partition and to vibrate said closure member and an operator means on the discharge side of said partition to enable shifting of said closure member and actuation of said vibrator.

10. A combination metering and agitating device for use in dusters which have a power means comprising: a unitary assembly including a plate adapted to form a partition wall between a duster dust storage hopper and a duster mixing chamber and having an opening therethrough, a plate valve member having a peripheral configuration substantially the same as said partition plate opening for controlling metered passage of dust through said plate opening, a bowed leaf spring secured to the hopper side of said partition wall and to said plate valve member biasing said plate valve member into said opening from the discharge side of the partition wall, and means secured to said plate valve member adapted to be cyclically engaged by the duster power means to shift said plate valve member in direction which tightens the bow in said leaf spring whereby said plate valve member will shift away from said plate opening on the discharge side of said partition wall.

11. A combination metering and agitating device as defined in claim 10 wherein a small member pivotally secured on the storage side of said plate partially blocks the opening in said plate and provides a combined adjustable metering quantity control and limit stop for said valving plate.

12. A dusting device for applying dusts such as insecticides and fungicides to plants comprising: a storage means for dust; a blower means including a mixing chamber for creating a confined flow of air transposed into a high velocity discharge stream; means providing communication between said hopper and said mixing chamber including a means providing a partition between said storage means and said mixing chamber and having an opening therethrough a bowed spring valving means cooperating with said opening to open and close said opening for controlling metered passage of dust through said partition opening and providing vibrator means on the dust storage side of said partition and an operator on the mixing chamber side of said partition; and means connected to said blower means and timed in direct relation to airflow, adapted to cyclically engage and thereby subject said operator to intermittent cyclical actuations.

13. A blower type portable dusting device comprising: a mixing chamber; a dust storage means above said chamber; means for intermittently dispensing metered particles of dust into said mixing chamber including a rotary power means with a rotary member, a combined cyclic metering and agitating device operated by said rotary member to assure flow movement of dust from said storage means automatically proportional to airflow; means, including a drive connection to said power means, for causing an airflow through said mixing chamber to mix and carry the dust particles in suspension out of said chamber and further including means in fluid communication with said chamber for receiving said mixed air and dust and ejecting said suspended dust particles in a high velocity higher volume airstream.

14. A dusting device as defined in claim 13 wherein said combined combination dust discharge metering and dust storage agitating device comprises: a unitary assembly including means adapted to form a partition between said dust storage means and said mixing chamber and having an opening therethrough; spring biased valving means for controlling metered passage of dust through said partition opening and providing vibrator means adapted to agitate the dust on the hopper side of said partition and an operator means on the discharge side of said partition adapted to be cyclically engaged by said power member.

15. A dusting device with apparatus for even distribution and dispensing of dust particles comprising: a duster body including a preliminary mixing chamber having an auxiliary preliminary air inlet; hopper means above said chamber for containing a stored quantity of dust; a combination metering and agitating device at the bottom end of said hopper means and providing a connection passage means to meter specific small quantities of dust from said hopper into said mixing chamber; a primary high volume air inlet; a high speed blower device and means enabling said blower device to receive air in independent paths from both inlets; and drive means connected to said blower device and operating said combination metering and agitating device providing automatically proportioning dust quantity to air volume and velocity in a high velocity discharge of an airstream.

16. A blower type portable dusting device comprising: a mixing chamber; a dust storage means above said chamber; means for intermittently dispensing metered particles of dust into said mixing chamber including a rotary power means and a combined cyclic metering and agitating device to assure flow movement of dust from said storage means automatically proportional to airflow; and means, including a drive connection to said power means for causing an airflow through said mixing chamber to mix and carry the dust particles in suspension out of said chamber and further including means in fluid communication with said chamber for receiving said mixed air and dust and ejecting said suspended dust particles in a high velocity higher volume airstream; said rotary power means including a rotary power member; said combined metering and agitating device comprising: a unitary assembly including a plate adapted to form a partition wall between said storage means and said mixing chamber and having an opening therethrough, a plate valve member having a peripheral configuration substantially the same as said partition wall opening for controlling metered passage of dust through said plate opening, a bowed leaf spring secured to the hopper side of said partition wall and to a midportion of said plate valve member biasing said plate valve member into said opening from the discharge side of the partition wall, and means secured to said plate valve member adapted to be cyclically engaged by said power member to intermittently shift said plate valve member in a direction which tightens the bow in said leaf spring and then release said plate valve member, whereby said plate valve member will be shifted away from said plate opening on the discharge side of said partition wall and snapped back into closed position.

17. A blower type portable dusting device comprising: a mixing chamber; a dust storage means above said chamber; means for intermittently dispensing metered particles of dust into said mixing chamber including a rotary power means and a combined cyclic metering and agitating device to assure flow movement of dust from said storage means automatically proportional to airflow; and means, including a drive connection to said power means for causing an airflow through said mixing chamber to mix and carry the dust particles in suspension out of said chamber and further including means in fluid communication with said chamber for receiving said mixed air and dust and ejecting said suspended dust particles in a high velocity higher volume airstream; said rotary power means including a rotary power member; said combined metering and agitating device comprising: a unitary assembly including a plate adapted to form a partition wall between said dust storage means and said mixing chamber and having an opening therethrough, a plate valve member having a peripheral configuration substantially the same as said partition wall opening for controlling metered passage of dust through said plate opening, a bowed leaf spring secured to said partition wall and to a midportion of said plate valve member disposing said plate valve member in said opening, and means secured to said plate valve member adapted to be cyclically engaged by said power member to intermittently shift said plate valve member in a direction to flex and stress the said bowed leaf spring and to then release said plate valve member, whereby said plate valve member will be shifted away from said plate opening and then snapped back under the bias of the stressed bow spring to the closed position.

References Cited in the file of this patent

UNITED STATES PATENTS

| | | |
|---|---|---|
| 1,727,526 | Thompson | Sept. 10, 1929 |
| 2,206,876 | Chater | July 9, 1940 |
| 2,240,030 | Bobrick | Apr. 29, 1941 |
| 2,319,233 | Hoppe | May 18, 1943 |
| 2,536,361 | Flanders | Jan. 2, 1951 |
| 2,550,354 | Jacobsen | Apr. 24, 1951 |
| 2,720,721 | Reynolds et al. | Oct. 18, 1955 |
| 2,762,537 | Reinhardt | Sept. 11, 1956 |
| 2,782,962 | Mercer | Feb. 26, 1957 |
| 2,892,286 | Martin | June 30, 1959 |